United States Patent
Fumey et al.

(10) Patent No.: US 10,860,379 B2
(45) Date of Patent: Dec. 8, 2020

(54) METHOD AND ELECTRONIC DEVICE FOR VERIFYING A PARTITIONING CONFIGURATION, ASSOCIATED COMPUTER PROGRAM

(71) Applicant: THALES, Courbevoie (FR)

(72) Inventors: Marc Fumey, Toulouse (FR); Michael Templier, Toulouse (FR); Christophe Mangion, Toulouse (FR)

(73) Assignee: THALES, Courbevoie (FR)

( * ) Notice: Subject to any disclaimer, the term of this patent is extended or adjusted under 35 U.S.C. 154(b) by 224 days.

(21) Appl. No.: 15/955,309

(22) Filed: Apr. 17, 2018

(65) Prior Publication Data
US 2018/0300179 A1    Oct. 18, 2018

(30) Foreign Application Priority Data
Apr. 18, 2017 (FR) ..................................... 17 00423

(51) Int. Cl.
*G06F 9/46* (2006.01)
*G06F 9/50* (2006.01)
*G06F 9/54* (2006.01)
*G06F 3/06* (2006.01)

(52) U.S. Cl.
CPC .......... *G06F 9/5027* (2013.01); *G06F 3/0644* (2013.01); *G06F 9/5061* (2013.01); *G06F 9/54* (2013.01)

(58) Field of Classification Search
None
See application file for complete search history.

(56) References Cited

U.S. PATENT DOCUMENTS

| | | | |
|---|---|---|---|
| 7,814,492 B1 | 10/2010 | Creemer et al. | |
| 8,782,296 B2 * | 7/2014 | Martinez | G06F 8/71 710/5 |
| 9,965,315 B1 * | 5/2018 | Hagen | G06F 9/45558 |
| 2009/0070769 A1 * | 3/2009 | Kisel | G06F 9/5011 718/104 |
| 2009/0235044 A1 | 9/2009 | Kisel et al. | |
| 2011/0154349 A1 | 6/2011 | Walton et al. | |
| 2011/0219371 A1 * | 9/2011 | Eide | G06F 9/455 718/1 |

OTHER PUBLICATIONS

Preliminary Search Report for FR 1700423, dated Jan. 22, 2018.

* cited by examiner

*Primary Examiner* — Kenneth Tang
(74) *Attorney, Agent, or Firm* — B. Aaron Schulman, Esq.; Stites & Harbison, PLLC

(57) ABSTRACT

The present invention relates to a method for verifying a partitioning configuration, between consuming elements (13), of resources (14) of an electronic module (12), each resource (14) having a capacity and being divisible into segments, the method comprising:
  verifying the compliance with a set of partitioning rules, according to which:
    the sum of the unitary capacities of the resource segments allocated for each resource (14) is less than the capacity of said resource (14),
    only the resource segments previously defined can be allocated to distinct consuming elements (13),
    the use of resource segments by a consuming element (13) is limited to the resource segments allocated to said consuming element (13),
    the partitioning configuration being considered valid when the set of partitioning rules is respected,
  exploiting the module (12) with the partitioning configuration.

10 Claims, 1 Drawing Sheet

METHOD AND ELECTRONIC DEVICE FOR VERIFYING A PARTITIONING CONFIGURATION, ASSOCIATED COMPUTER PROGRAM

TECHNICAL FIELD OF THE INVENTION

The present invention relates to a method for verifying a partitioning configuration, between a plurality of consuming elements, of at least one resource of an electronic module of an avionics system. The invention also relates to an associated computer program. The invention also relates to an associated electronic verification device.

BACKGROUND OF THE INVENTION

The avionics functions performing different functions to carry out a flight are generally installed on different platforms and use the resources of said platforms. Such functions being critical, for example the braking system or the flight management system, the configuration of the platforms, as well as the processes for integrating functions on the platforms, must meet strict constraints.

To that end, IMA (Integrated Modular Avionics) architectures integrating partitioning techniques have been developed. Such architectures seek to integrate different avionics functions on one or several modules, while making sure that each avionics function cannot affect another function in an uncontrolled manner.

Partitioning is an isolation (or segregation) technique seeking to make the use of components, used by different applications, independent from one application to another, so as to reduce interference between these applications and control their interactions. Partitioning within an IMA architecture allows independent applications to share the same components or resources without said applications having uncontrolled interactions with one another.

Some IMA approaches follow an incremental certification process intended to facilitate the integration activities and to allow industrial independence between the different applications.

However, such incremental certification processes are relatively cumbersome to carry out.

Introducing notions of partitions, resource budgets associated with the partitions, separation of the elements of each of the partitions in files defining the configuration of the module, makes it possible to simplify the demonstration of the partitioning, but the guarantee of the partitioning is nevertheless based on many rules to be followed and verified for the integration of the different applications.

Furthermore, in order for the partitioning to be demonstrated, such a process requires proving the exhaustiveness of the rules for the partitioning. Furthermore, in order for the partitioning to be effectively guaranteed, all of the partitioning rules must be verified by qualified tools, for all of the players involved, which increases the complexity of the process.

There is therefore a need for a method for verifying a resource partitioning configuration of an avionics system among elements consuming resources of said system that is easier to implement.

SUMMARY OF THE INVENTION

To that end, the invention relates to a method for verifying a partitioning configuration, between a plurality of consuming elements, of at least one resource of an electronic module of an avionics system, each resource having a capacity and being divisible into segments, the partitioning configuration corresponding, for each resource, to:
  a division of the resource into one or several resource segments, each segment having a unitary capacity,
  an allocation of at least one resource segment to one or several consuming elements,
  a use, by each consuming element, of at least one allocated resource segment,
the avionics system comprising an electronic verification device, the method being implemented by the electronic verification device and comprising:
  verifying the compliance with a set of partitioning rules, the set of partitioning rules comprising at least the following rules:
    a first rule according to which the sum of the unitary capacities of the resource segments allocated for each resource is less than or equal to the capacity of said resource,
    a second rule according to which only the resource segments previously defined can be allocated to distinct consuming elements,
    a third rule according to which the use of resource segments by a consuming element is limited to the resource segments allocated to said consuming element,
  the partitioning configuration being considered valid when the set of partitioning rules is respected,
  exploiting the module with the partitioning configuration.

According to specific embodiments, the method comprises one or more of the following features, considered alone or according to any technically possible combinations:
  at least one rule of the set of rules is verified before the exploitation of the module with the partitioning configuration, said rule being, preferably, the first rule and/or the second rule;
  all of the rules of the set of rules are verified before exploiting the module with the partitioning configuration;
  the verification comprises launching the module with the partitioning configuration, the partitioning configuration being considered valid when the module starts with the partitioning configuration, and the partitioning configuration being considered invalid when the module does not start with the partitioning configuration;
  when the partitioning configuration is considered invalid, the method comprises the repetition of the verification of the parts, considered individually, of the partitioning configuration, part of the partitioning configuration being considered valid when the module starts with said part of the partitioning configuration, and part of the partitioning configuration being considered invalid when the module does not start with said part of the partitioning configuration;
  the electronic module comprises the electronic verification device;
  for each continuous resource, the capacity is expressed in the form of an allocated space defined by a start indicator and an end indicator, the allocation of resource segments being expressed in the form of allocated sub-spaces each defined by a start indicator and an end indicator, the allocated sub-spaces being stored in a configuration table by increasing order of the start indicator of said allocated sub-spaces, the partitioning configuration being considered invalid when at least one of the following conditions is met:

the start indicator or the end indicator of an allocated sub-space is comprised between the start indicator and the end indicator of another allocated sub-space in the configuration table, the start indicator or the end indicator of an allocated sub-space of the configuration table is not comprised, broadly speaking, between the start indicator and the end indicator of the allocated space;

for discrete resources, the resource segments are listed in a configuration table, the allocation of resource segments associating the listed resource segments with consuming elements, the partitioning configuration being considered invalid when at least one of the following conditions is met:

a listed resource segment is associated with more than one consuming element while said resource segment is not part of the resource segments able to be allocated to distinct consuming elements, and a consuming element is associated with a resource segment not appearing in the list.

The invention also relates to a computer program comprising software instructions which, when executed by a computer, implement a method as previously described.

The invention further relates to a device for verifying a partitioning configuration, between a plurality of consuming elements, of at least one resource of an electronic module of an avionics system, each resource having a capacity and being divisible into segments, the partitioning configuration corresponding, for each resource, to:

a division of the resource into one or several resource segments, each segment having a unitary capacity, an allocation of at least one resource segment to one or several consuming elements, a use, by each consuming element, of at least one allocated resource segment, the electronic verification device comprising:

a module for verifying the compliance with a set of partitioning rules, the set of partitioning rules comprising at least the following rules:

a first rule according to which the sum of the unitary capacities of the resource segments allocated for each resource is less than or equal to the capacity of said resource, a second rule according to which only the resource segments previously defined can be allocated to distinct consuming elements, a third rule according to which the use of resource segments by a consuming element is limited to the resource segments allocated to said consuming element, the partitioning configuration being considered valid when the set of partitioning rules is respected, a module for exploiting the module with said partitioning configuration.

BRIEF DESCRIPTION OF THE DRAWINGS

Other features and advantages of the invention will appear upon reading the following description of embodiments of the invention, solely as an example and done in reference to the drawings, which are.

DETAILED DESCRIPTION OF SOME EMBODIMENTS

Figure 1:
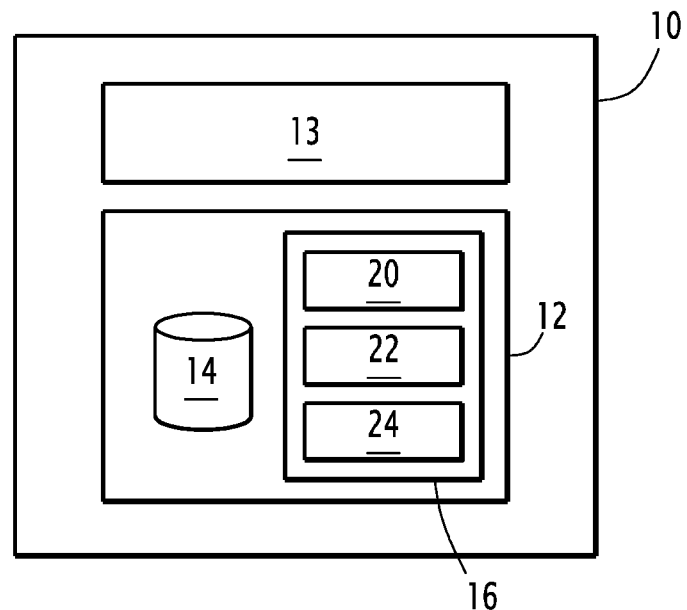
FIG. 1 is a schematic illustration of an avionics system according to a first embodiment of the invention.
Figure 2:
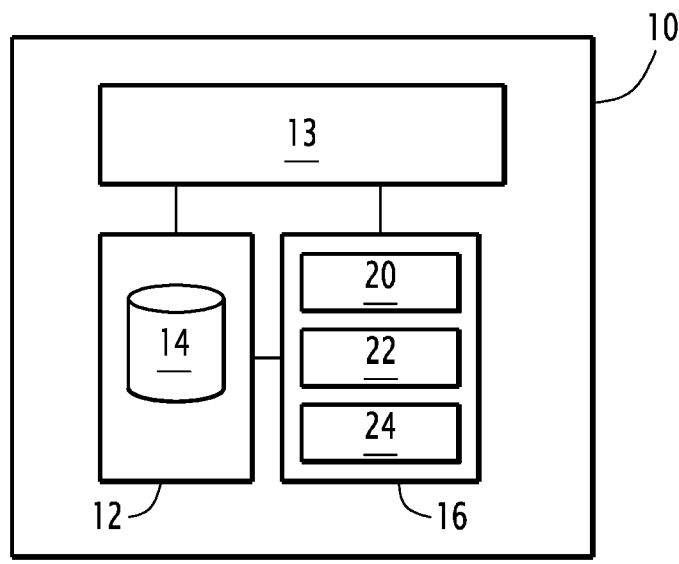
FIG. 2 is a schematic illustration of an avionics system according to a second embodiment of the invention.

An avionics system 10 is illustrated in FIGS. 1 and 2.

According to a first embodiment, the avionics system 10 comprises elements 13 consuming resource(s) 14, a module 12 and an electronic device 16 for verifying a partitioning configuration.

In the rest of the description, each element 13 consuming resource(s) 14 is also called application, and the term "application" is then similar to the term "element consuming resource(s)" within the meaning of the invention.

The consuming elements 13 are for example functions of the avionics system 10, part of which is installed on IMA architectures. The consuming elements 13 are for example computer programs using resources 14, physical elements, also called hardware, using resources 14, or configuration tables describing, or defining, the use of the resources 14 (typical of an input/output resource). More particularly, the consuming elements 13 are for example flight management programs or programs to control the braking system of the avionics system 10.

The consuming elements 13 are able to be remote from the module 12 housing the resources 14 in question (for example, when the resource 14 is a router of the avionics network).

Each element 13 has operating constraints. The operating constraints define interactions between the consuming elements 13. For example, the operating constraints prohibit interactions between certain consuming elements 13 and allow interactions between specific elements 13.

Such functional constraints are reflected by the grouping of consuming elements 13 into partitions. The consuming elements 13 of different partitions are independent of one another. The consuming elements 13 of a same partition have no independence constraint relative to one another.

As an illustration, the module 12 is for example one of the following elements or a combination of several of the following elements:

a computing module comprising a processor associated with a memory making it possible to execute application software, an input/output acquisition module making it possible to sample and convert data formats, and to send said data over an avionics network for local or remote applications, an avionics network made up of routers, a display module made up of processors, comprising at least one graphic processor, and a monitor, or a data storage module making it possible to share data between several local or remote applications.

In the embodiment illustrated by FIG. 1, the module 12 comprises a plurality of resources 14 and an electronic device 16 for verifying a partitioning configuration of the resources 14 of the module 12 between the consuming elements 13.

As an optional addition, the module 12 further comprises:

inputs and outputs (for example discrete, analog, ARINC 429 aeronautics buses or ADC buses), and/or a connection to an avionics network for example compliant with standard ARINC 664, and/or an acquisition device making it possible to sample and extract data, convert said data into an appropriate format and form, from said data, messages intended to be sent over an avionics network, such an acquisition device generally being configurable to be adaptable to the various needs of systems on board an airplane.

The resources 14 of the module 12 are physical or logic elements able to be provided to elements 13 consuming local resources, i.e., elements belonging to the module 12, or elements 13 consuming remote resources, i.e., elements not belonging to the module 12 and able to be positioned at a distance from the module 12.

The resources 14 are for example distributed in the following categories:
- resources of the data processing type. Such resources are for example the computing power of a processor or the storage capacity of a memory.
- resources of the input and output types.
- resources specific to the avionics network. Such resources are for example the communication routers of an ARINC664 network.
- resources of the graphic type, i.e., resources allowing a display. A monitor is one example of such resources.
- resources of the mass memory type.

In general, the categories separate the resources based on their intended use.

The resources 14 of such resource categories are able to be distinguished in the following (non-exhaustive) subcategories:
- a subcategory for the different types of memory (RAM, ROM, NVM, etc.).
- a subcategory for storage media (discs).
- a subcategory for computing processors.
- a subcategory for graphics processors.
- a subcategory for the different types of inputs/outputs (discrete, analog, ARINC 429 bus, ADC).
- a subcategory for access points to the avionics network (ARINC A664).
- a subcategory for the avionics network routers.
- a subcategory for the monitors for displaying avionics information.

In general, the subcategories separate the resources 14 based on their nature.

Each resource 14 has a capacity. The capacity of each resource 14 characterizes the size of said resource 14.

For a resource 14 of the input-output type, the capacity of said resource 14 is quantifiable by the number of different inputs and outputs of said resource 14 (for example, the number of discrete, analog, ARINC 429 bus, etc. inputs).

For a resource 14 of the data processing type, the capacity of said resource 14 is quantifiable by the computing power of said resource 14 and/or the storage volume of the memory of said resource 14.

Each resource 14 can be divided into resource segments. Each resource segment has a unitary capacity. Each resource segment is independent of the other resource segments.

For example, if one assumes that the resource 14 is a memory, the resource segments are memory fragments identified, for example, by an address and a size.

In the embodiment illustrated by FIG. 1, provided as an example, the verification device 16 comprises a processor 20, a memory 22 and an information medium reader 24.

As an optional addition, as long as the device 16 is a component of the module 12, the processor 20, the memory 22 and the information medium reader 24 of the verification device 16 can be shared with other components of the module 12.

In the first embodiment illustrated by FIG. 1, the verification device 16 is advantageously on board the module 12.

The verification device 16 is intended to interact with a computer program product comprising a readable information medium able to be read by the reader 24 of the module 12.

The readable information medium of the computer program product is for example a medium suitable for storing electronic instructions and able to be coupled with a bus of a computer system. As an example, the readable information medium is a floppy disk, an optical disc, a CD-ROM, a magnetic-optical disc, a ROM memory, a RAM memory, any type of non-volatile memory (for example, EPROM, EEPROM, FLASH, NVRAM), a magnetic card or an optical card.

A computer program comprising program instructions is stored on the readable information medium.

The computer program can be loaded on the processor 20 and is suitable for causing the implementation of a method for verifying a partitioning configuration, between a plurality of consuming elements 13, of at least one resource 14 of an electronic module 12 of an avionics system 10 as will be described later in the description.

Alternatively, the verification device is of the hardware type, such as a field programmable gate array (FPGA), or a dedicated integrated circuit, such as an ASIC (Application-Specific Integrated Circuit).

A method for verifying a partitioning configuration, between a plurality of consuming elements 13, of at least one resource 14 of an electronic module 12 of an avionics system 10 will now be described.

The partitioning configuration corresponds, for each resource 14, to:
- a division of the resource 14 into one or several resource segments,
- an allocation of at least one resource segment to one or several consuming elements 13, and
- a use, by each consuming element 13, of at least one allocated resource segment.

For example, when one of the resources 14 is a communication bus, the capacity of said resource 14 is the number of messages able to be transmitted per unit of time via the communication bus. Each resource segment is a set of messages able to be transmitted per unit of time. The allocation is the allocation of a number of messages able to be transmitted per unit of time. The use of resource segments by a consuming element 13 is the number of messages used per unit of time by said consuming element 13, as well as the configuration elements related to the processing of said messages.

In another example, when at least one of the resources 14 is a memory, the capacity of said resource 14 is the size of the memory. Each resource segment is a memory portion. The use comprises defining a set of data allowed to be stored in the memory portion.

The verification method first comprises a step 100 for verifying the compliance of a set of partitioning roles.

The set of partitioning rules comprises at least the following rules:
- a first rule according to which the sum of the unitary capacities of the resource segments allocated for each resource 14 is less than or equal to the capacity of said resource 14.
- a second rule according to which only the resource segments previously defined can be allocated to distinct consuming elements 13, unless sharing is authorized. The allocation of resource segments is therefore consistent among the various consuming elements 13.
- a third rule according to which the use of resource segments by a consuming element 13 is limited to the resource segments allocated to said consuming element 13.
- the partitioning configuration being considered valid when the set of partitioning rules is respected.

The verification step 100 is for example carried out by launching the module 12 with the partitioning configuration. The launching of the module is equivalent to an initialization phase of the module 12.

The partitioning configuration is considered valid when the module 12 starts up with the partitioning configuration.

The partitioning configuration is considered invalid when the module 12 does not start up with the partitioning configuration.

For example, for each continuous resource 14, the capacity is expressed in the form of an allocated space defined by a start indicator and an end indicator. The allocation of resource segments is expressed in the form of allocated sub-spaces each defined by a start indicator and an end indicator. The allocated sub-spaces are stored in a configuration table by increasing order of the start indicator of said allocated sub-spaces. In this example, the partitioning configuration is considered invalid when at least one of the following conditions is met:

the start indicator or the end indicator of an allocated sub-space is comprised between the start indicator and the end indicator of another allocated sub-space in the configuration table, the start indicator or the end indicator of an allocated sub-space of the configuration table is not comprised, broadly speaking, between the start indicator and the end indicator of the allocated space.

As an alternative to this example, the capacity is defined solely in the form of a start indicator and a size. The size is for example a size of a memory in bytes, a bandwidth of a communication channel in megabits per second, a number of available input and output interfaces, a duration or a time offset.

In another example, for discrete resources 14, the resource segments are listed in a configuration table. The allocation of resource segments associates the listed resource segments with consuming elements 13. The partitioning configuration is considered invalid when at least one of the following conditions is met:

a listed resource segment is associated with more than one consuming element while said resource segment is not part of the resource segments able to be allocated to distinct consuming elements 13, and a consuming element is associated with a resource segment not appearing in the list.

Then, when the partitioning configuration is considered valid at the end of the verification step 100, the verification method comprises an exploitation step 110 of the module 12 with said partitioning configuration.

The verification of compliance with the set of partitioning rules is carried out only before the exploitation of the module 12.

When the partitioning configuration is considered invalid, the method comprises the repetition of the verification step 100 in parts, taken individually, of the partitioning configuration. One part of a partitioning configuration is for example part of the allocation of said partitioning configuration, i.e., only some of the resource segments allocated to the partitioning configuration.

A part of the partitioning configuration is considered valid when the module 12 starts up with said part of the partitioning configuration. A part of the partitioning configuration is considered invalid when the module 12 does not start up with said part of the partitioning configuration.

Thus, such a verification method is simpler to implement than an incremental certification method of the state of the art, for which complex verification tools are implemented to verify the compliance of the partitioning during the configuration process of the module 12.

With the proposed method, there is no longer a need for outside rules to be verified once the module 12 is working with the valid partitioning configuration verified by the module itself. There is therefore no longer a need for prior verification of a partitioning usage domain for the qualification, since a valid partitioning obtained at the end of the verification method previously described intrinsically ensures that the partitioning is respected.

Such a method is further applicable to any type of resources 14.

Such a method also allows greater possibilities in the design of the partitioning relative to the methods of the state of the art.

Such a method also has better resistance to outside attacks. Indeed, to arrive at a failure of the partitioning through an action outside the module 12, a third party must act on several elements coherently, namely dividing the resources 14 into segments and allocating resource segments, consistently so as to pass through the partitioning mechanisms. An inconsistent alteration of an element will be intercepted during the verification step 100 and will not generate an undetected erroneous behavior. The method therefore makes it possible to adapt the partitioning of the module 12 autonomously and in real-time.

According to a second embodiment as shown in FIG. 2, the verification device 16 of the second embodiment is separate from the module 12 and is not on board the module 12. The verification device 16 is then one of the components of the avionics system 10 or even an element outside the avionics system 10 (typically a tool for generating the configuration) and no longer a component of the module 12. Aside from such a change, the second embodiment is identical to the first embodiment.

The verification method carried out by the verification device 16 is identical to that described for the first embodiment, with the difference that the verification step 100 is carried out within the verification device 16, and not by launching the module 12.

The verification step 100 then consists of verifying the validity of the proposed partitioning configuration, only before the exploitation step 110 of the module. If the proposed partitioning is not validated, the configuration is not generated or transmitted to the module, and the latter therefore cannot reach the exploitation step 110.

Then, only a partitioning considered to be valid is implemented on the module 12 and the exploitation step 110 is identical to that of the first embodiment.

Aside from the advantages of the first operating mode, such a second operating mode has the advantage of determining a partitioning from a tool (the verification device 16) separate from the module 12, which lightens the design of the module 12. Such a second operating mode thus makes it possible to achieve an intrinsic partitioning level without completely changing the design of the module 12.

According to one alternative of the verification method, at least one rule of the set of rules is verified before the exploitation of the module with the partitioning configuration, said rule preferably being the first rule and/or the second rule. The other rules may then be verified after said exploitation of the module, corresponding to the starting up of the module.

For example, the first and second rules (relative to the allocations) are verified before the exploitation of the module, and the third rule (relative to the use) is verified only during the initialization of the applications, or even in the operational phase before use the application of the resources allocated to this application.

One skilled in the art will understand that such an alternative should be interpreted with the compatible elements of the first and second embodiments of the verification method described previously.

The invention claimed is:

1. A method for statically verifying a partitioning configuration, between a plurality of consuming elements, of at least one resource of an electronic module of an avionics system, each resource having a capacity and being divisible into segments, the partitioning configuration corresponding, for each resource, to:
   a division of the resource into one or several resource segments, each segment having a unitary capacity,
   an allocation of at least one resource segment to one or several consuming elements, and
   a use, by each consuming element, of at least one allocated resource segment,
   the avionics system comprising an electronic verification device, the method being implemented by the electronic verification device and comprising:
   verifying the compliance with a set of partitioning rules, the set of partitioning rules comprising at least the following rules:
   a first rule according to which the sum of the unitary capacities of the resource segments allocated for each resource is less than or equal to the capacity of said resource,
   a second rule according to which only the resource segments previously defined can be allocated to distinct consuming elements, and
   a third rule according to which the use of resource segments by a consuming element is limited to the resource segments allocated to said consuming element,
   the partitioning configuration being considered valid when the set of partitioning rules is respected, and
   exploiting the module with the partitioning configuration wherein the verification comprises launching the module with the partitioning configuration,
   the partitioning configuration being considered valid when the module starts up with the partitioning configuration, and
   the partitioning configuration being considered invalid when the module does not start up with the partitioning configuration.

2. The method according to claim 1, wherein at least one rule of the set of rules is verified before the exploitation of the module with the partitioning configuration,
   said rule being the first rule and/or the second rule.

3. The method according to claim 1, wherein all of the rules of the set of rules are verified before exploiting the module with the partitioning configuration.

4. The method according to claim 1, wherein when the partitioning configuration is considered invalid, the method comprises the repetition of the verification on the parts, taken individually, of the partitioning configuration,
   a part of the partitioning configuration being considered valid when the module starts up with said part of the partitioning configuration, and
   a part of the partitioning configuration being considered invalid when the module does not start up with said part of the partitioning configuration.

5. The method according to claim 1, wherein the electronic module comprises the electronic verification device.

6. The method according to claim 1, wherein, for each continuous resource, the capacity is expressed in the form of an allocated space defined by a start indicator and an end indicator, the allocation of resource segments being expressed in the form of allocated sub-spaces each defined by a start indicator and an end indicator, the allocated sub-spaces being stored in a configuration table by increasing order of the start indicator of said allocated sub-spaces, the partitioning configuration being considered invalid when at least one of the following conditions is met:
   the start indicator or the end indicator of an allocated sub-space is comprised between the start indicator and the end indicator of another allocated sub-space in the configuration table, or
   the start indicator or the end indicator of an allocated sub-space of the configuration table is not comprised, broadly speaking, between the start indicator and the end indicator of the allocated space.

7. The method according to claim 1, wherein for discrete resources, the resource segments are listed in a configuration table, the allocation of resource segments associating the listed resource segments with consuming elements, the partitioning configuration being considered invalid when at least one of the following conditions is met:
   a listed resource segment is associated with more than one consuming element while said resource segment is not part of the resource segments able to be allocated to distinct consuming elements, or
   a consuming element is associated with a resource segment not appearing in the list.

8. A non-transitory computer readable medium, the support comprising a computer program comprising software instructions which, when executed by a computer, carry out a method according to claim 1.

9. A non-transitory device for statically verifying a partitioning configuration, between a plurality of consuming elements, of at least one resource of an electronic module of an avionics system, each resource having a capacity and being divisible into segments, the partitioning configuration corresponding, for each resource, to:
   a division of the resource into one or several resource segments, each segment having a unitary capacity,
   an allocation of at least one resource segment to one or several consuming elements, and
   a use, by each consuming element, of at least one allocated resource segment, said device comprising:
   a module for verifying the compliance with a set of partitioning rules, the set of partitioning rules comprising at least the following rules:
   a first rule according to which the sum of the unitary capacities of the resource segments allocated for each resource is less than or equal to the capacity of said resource,
   a second rule according to which only the resource segments previously defined can be allocated to distinct consuming elements, and
   a third rule according to which the use of resource segments by a consuming element is limited to the resource segments allocated to said consuming element,
   the partitioning configuration being considered valid when the set of partitioning rules is respected,
   and a module for exploiting the module with said partitioning configuration;
   wherein said device is configured so that the verification comprises launching the module with the partitioning configuration, the partitioning configuration being considered valid when the module starts up with the partitioning configuration, and the partitioning configuration being considered invalid when the module does not start up with the partitioning configuration.

10. A method for verifying a partitioning configuration, between a plurality of consuming elements, of at least one resource of an electronic module of an avionics system, each resource having a capacity and being divisible into segments, the partitioning configuration corresponding, for each resource, to:
- a division of the resource into one or several resource segments, each segment having a unitary capacity,
- an allocation of at least one resource segment to one or several consuming elements, and
- a use, by each consuming element, of at least one allocated resource segment, the avionics system comprising an electronic verification device, the method being implemented by the electronic verification device and comprising:

verifying the compliance with a set of partitioning rules, the set of partitioning rules comprising at least the following rules:

a first rule according to which the sum of the unitary capacities of the resource segments allocated for each resource is less than or equal to the capacity of said resource, a second rule according to which only the resource segments previously defined can be allocated to distinct consuming elements, and a third rule according to which the use of resource segments by a consuming element is limited to the resource segments allocated to said consuming element, the partitioning configuration being considered valid when the set of partitioning rules is respected, and exploiting the module with the partitioning configuration;

wherein, for each continuous resource, the capacity is expressed in the form of an allocated space defined by a start indicator and an end indicator, the allocation of resource segments being expressed in the form of allocated sub-spaces each defined by a start indicator and an end indicator, the allocated sub-spaces being stored in a configuration table by increasing order of the start indicator of said allocated sub-spaces, the partitioning configuration being considered invalid when at least one of the following conditions is met:

the start indicator or the end indicator of an allocated sub-space is comprised between the start indicator and the end indicator of another allocated sub-space in the configuration table, or the start indicator or the end indicator of an allocated sub-space of the configuration table is not comprised, broadly speaking, between the start indicator and the end indicator of the allocated space.

* * * * *